July 2, 1929.  D. T. SHARPLES  1,719,522
CREAM SEPARATOR
Filed May 19, 1924  3 Sheets-Sheet 1
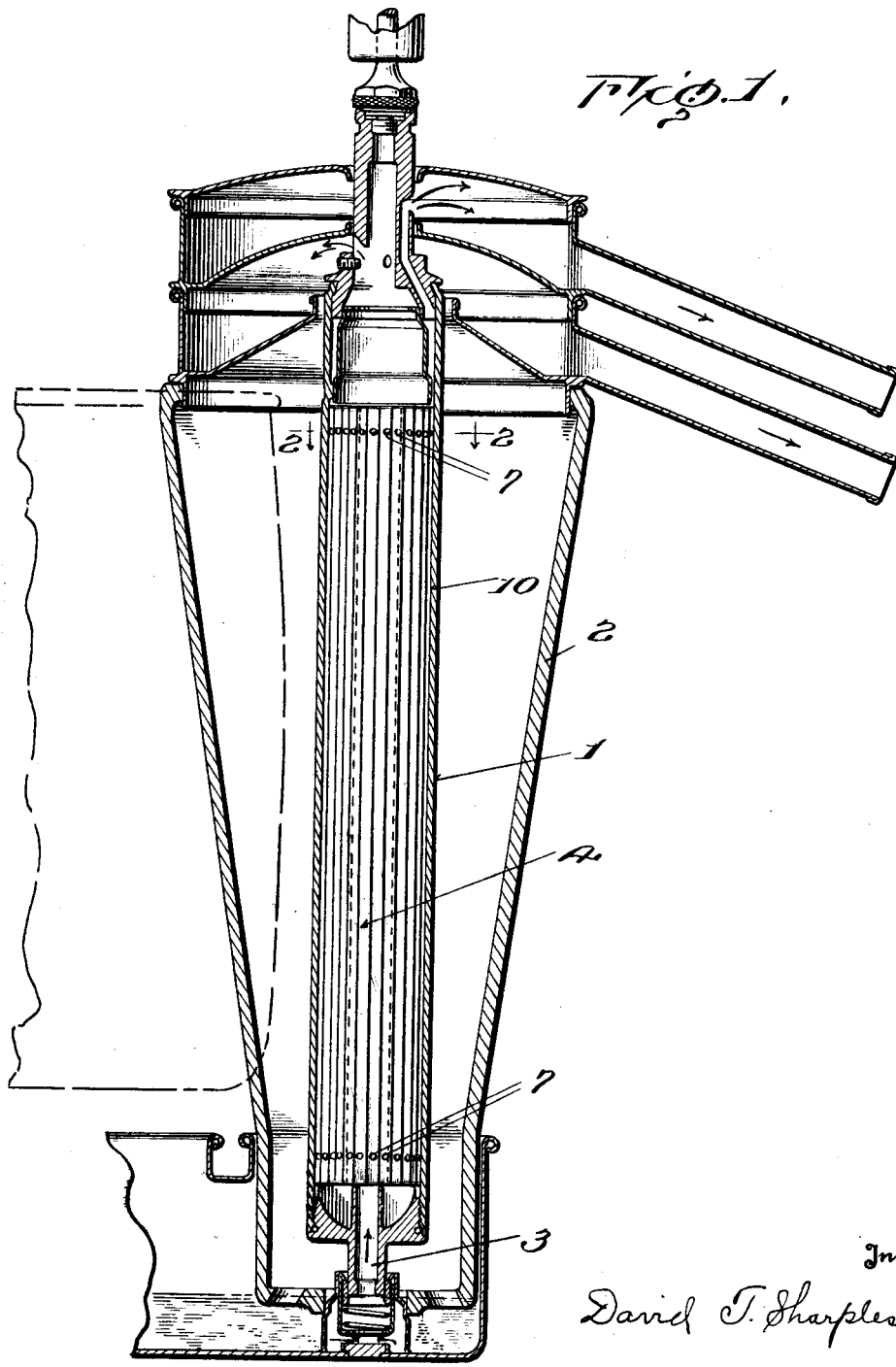

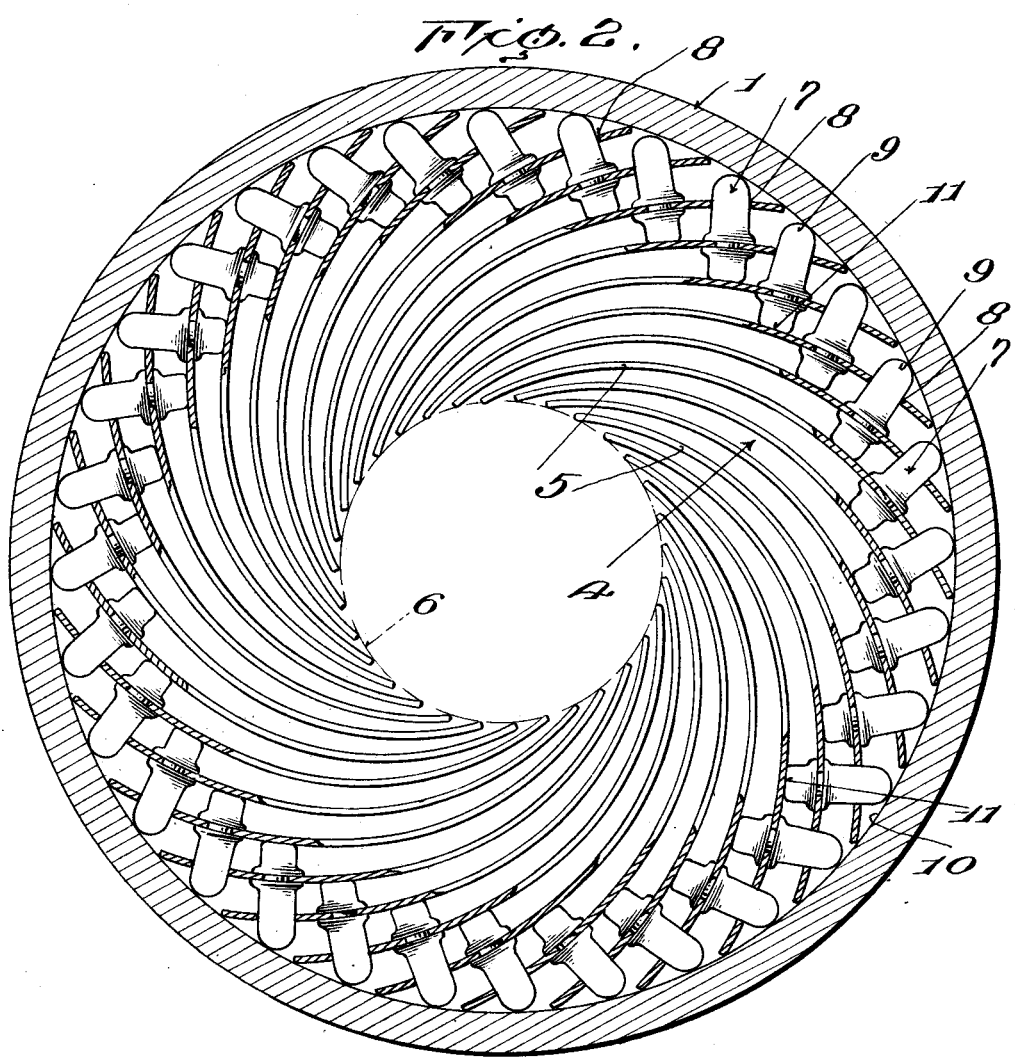

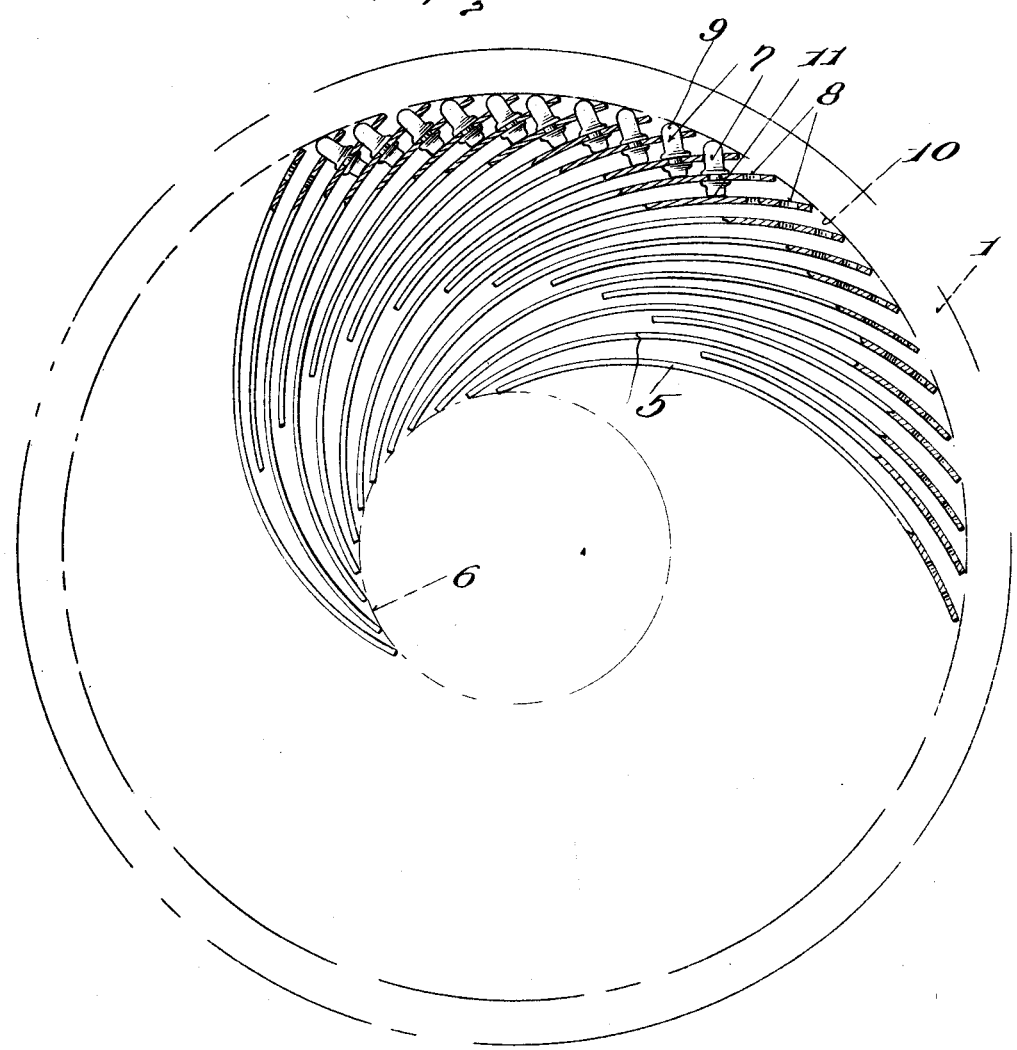

Patented July 2, 1929.

1,719,522

UNITED STATES PATENT OFFICE.

DAVID T. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

CREAM SEPARATOR.

Application filed May 19, 1924. Serial No. 714,356.

The invention relates to new and useful improvements in cream separators, and more particularly to the liner of the separator bowl which divides the milk into thin layers and assists in the separation of the cream from the milk.

An object of the invention is to provide a liner for a separator bowl, wherein the plates forming the liner are curved so as to secure an easy flow of the cream toward the center of the bowl and at the same time, the most efficient separation of the cream.

A further object of the invention is to provide a liner of the above type wherein the liner may be readily removed from the bowl and the plates thereof readily separated for cleaning purposes.

A still further object of the invention is to provide an efficient supporting means for the plates of the liner, so that said plates will be held in rigid position notwithstanding the extreme rapid rotation of the bowl.

A still further object of the invention is to provide a liner construction for a separator bowl which permits of auxiliary plates being used when liners are provided for bowls of relatively large diameter, which auxiliary plates extend a less distance in toward the center of the bowl than the main plates of the liner.

These and other objects will in part be obvious and will in part be hereinafter more fully disclosed.

In the drawings which show by way of illustration one embodiment of the invention—

Figure 1 is a vertical sectional view through a separator bowl of standard type having my improved liner therein;

Fig. 2 is an enlarged transverse sectional view through the liner on the line 2—2 of Fig. 1, and Fig. 3 is a diagrammatic view similar to Fig. 2, but showing a slightly modified form of arrangement of plates.

The invention is directed broadly to a liner adapted to be used in connection with the standard separator bowls, such as put out by the Sharples Separator Company, which consist of a relatively long cylindrical bowl adapted to be rotated at high speed for separating the cream. This liner consists of a series of plates which are curved so that the horizontal section shows the plates nested in spiral relation to each other. The plates are all substantially curved alike, and these curves are so formed that the angle which a plate forms with various radial lines are all equal. This angle is such as to permit the free flow of the cream along the outer surfaces of the plates toward the center of the bowl, and at the same time, said angle is so formed that the curved plate will bring about a most efficient separation of the cream. The plates are removably secured together by suitable spuds, which preferably extend through the plates so as to rest against the inner periphery of the bowl and thus rigidly support the plates and prevents any dislodgment of the same through the rapid rotation of the separator bowl.

Referring more in detail to the drawings, I have shown my improved liner as placed in a separator having a revolving separator bowl 1 suitably mounted in a casing 2. The milk enters the separator bowl at the point 3 and passes upwardly into the liner through the centrifugal force acting thereon, and finally the separated cream leaves the upper end of the bowl through a passage into a discharge spout which carries the cream into a receptacle for collecting the same. I have not attempted to explain in detail the passages for the milk and cream, as these are of the well known construction.

My invention is directed to the liner which is indicated at 4 in the drawings. This liner as clearly shown in Fig. 2, consists of a series of plates which extend preferably the full length of the bowl, although this is not absolutely necessary. These curved plates are indicated at 5 in the drawings. Said plates are all similar in construction and are similarly curved, and it will not be necessary to describe each plate in detail. The plates as shown in Fig. 2 all terminate at a line 6 adjacent the center of the bowl. Of course, it is understood that Fig. 2 is a very much enlarged drawing of the liner. These liners are adapted for bowls of the ordinary commercial size, varying possibly from two to four and one-half inches in diameter. Secured to each plate is a spud 7 which is upset or riveted thereto in any suitable way. Said spud is adapted to pass through the opening 8 in the next adjacent plate outside of the plate to which it is attached, and the outer end of the spud rests at 9 against the inner periphery of the separator bowl which is indicated at 10.

In the form of the invention shown in Fig. 2, the inner end of this spud rests at 11 against the next inner plate in the liner. It will be understood that any number of these spuds may be used lengthwise of the plates and radially of the bowl. I have only illustrated one set of spuds. The spuds which are near the center of the bowl, of course, will not bear against the periphery of the bowl, but will bear against the next adjacent inner and outer plates. These spuds are arranged so that they bear against the inner surface of the bowl, and any force tending to move the next inner adjacent plate outward, carries it against the spud so that the plate is really supported at two points, and prevented from movement outwardly under the centrifugal force acting thereon. Inasmuch as these spuds pass through openings or slots in the plates, the whole liner may be readily removed from the bowl for cleaning, and the plates readily separated one from another.

It will be understood of course, that this means for supporting the plates so that they are readily separated one from the other, and yet firmly supported within the bowl may be widely varied without departing from the spirit of the invention as set forth in the appended claims.

I have determined that when the plate is set at a certain inclination to the radius, the cream will drift toward the center along the outer surface of the curved plate without sufficient tendency to clog or stick to the surface to cause any harm. The preferred inclination is about thirty degrees, although this may be varied more or less to a certain extent. By making the plates more nearly radial, the cream will more readily slide or flow toward the center, while by making them more nearly at right angles to the radius, will give greater width of plate and consequently fewer plates. In addition to this (provided the cream will flow), the plates most nearly at right angles to the radius are more efficient, because the distance on the radius is shorter, and thus more plates will cross any given radius. If the plates are at a considerable angle to the radius, the distance on the radial line between them is greater in length, so less of the plates can be made to cross a given radius of the margin and will be less efficient, though the cream will flow more easily. It will readily be seen, therefore, that there is just the right angle at which the cream will flow, and which at the same time, will secure the greatest practical efficiency. So far as I am aware prior to my invention, the vanes of separators have presented different angles to the radius at different points, so that while the plate may be efficient at one point, it is too flat at another, or too inclined at another. The present invention as has already been stated is directed particularly to the shaping of the plates so that said plate will be arranged at the most efficient angle for proper flow and separation of cream at all points throughout. As has been stated, these plates are curved so that each plate at every point where it crosses the radius will cross the radius at the same angle. This is known mathematically as an equiangular spiral as the tangent at any point in the spiral makes a constant angle with the radius vector at that point. This is the form of the curve where the plate at every point where it crosses the radius will cross said radius at the same angle. In the preferred form of the invention this angle is about thirty degrees.

The centrifugal force in bowls of large diameter is intense, and the supporting of the plates to prevent any collapse is difficult. By my improved arrangement of spuds, particularly where spuds are disposed between the outer spuds bearing on the inner periphery of the bowl and the center of the bowl, I am able to provide a very rigid support for the plates. Also it will be obvious that when the liner is removed from the bowl, the plates may be separated from each other widely enough to brush and clean them completely. Where the angles are all made equal, as explained above, it throws the two contiguous plates further apart at the outer ends than at the inner ends. In the construction of liners for bowls of relatively large diameter, it is desirable to provide auxiliary plates as clearly shown in Fig. 3 of the drawings, where the plates are indicated at 12. These plates are curved after a similar manner to the main plates, the main difference being that they are shorter, and terminate at a point further out from the center, so as to permit the free flowing of the cream toward the center of the bowl. The same arrangement of spuds is used for supporting these plates.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A centrifugal cream separator comprising in combination a rotary separator bowl and a skimming device located in said bowl, said device including a series of permanently curved plates shaped so that a horizontal section of the plates delineates an equiangular spiral curve cutting every radius passing through the plates at an approximately constant angle, and means engaging said plates and holding the same in fixed spaced relation to each other, said holding means being disposed so as to provide a free space between the inner ends of said spaced plates.

2. A centrifugal cream separator comprising in combination a rotary separator bowl and a skimming device located in said bowl, said device including a series of permanently curved plates shaped so that a horizontal section of the plates delineates an equiangular spiral curve cutting every radius passing through the plates at an approximately constant angle, and means disposed wholly at the outer edges of said plates for holding said plates in fixed spaced position relative to each other.

3. A centrifugal cream separator comprising in combination a rotary separator bowl and a skimming device located in said bowl, said device including a series of permanently curved plates shaped so that a horizontal section of the plates delineates an equiangular spiral curve cutting every radius passing through the plates at an approximately constant angle, and means located adjacent the outer edges of said plates for holding said plates in fixed spaced position relative to each other, said means including studs secured to each plate and adapted to bear at their inner ends against the next adjacent plate and at their outer ends against the wall of the bowl.

4. A centrifugal cream separator comprising a rotary separator bowl and a skimming device including a series of permanently curved plates shaped so that a horizontal section of the plates delineates an equiangular spiral curve cutting every radius passing through the plates at approximately 30°, and means engaging said plates and holding the same in fixed spaced relation to each other, said holding means being disposed so as to provide a free space between the inner ends of said spaced plates.

5. A centrifugal cream separator comprising a rotary separator bowl and a skimming device including a series of permanently curved plates shaped so that a horizontal section of the plates delineates an equiangular spiral curve cutting every radius passing through the plates at approximately 30°, and means for holding said plates in fixed spaced relation to each other, said means being located wholly at the outer edges of said plates so that the inner edges of the plates are supported freely from each other.

6. A skimming device for a centrifugal separator bowl comprising a series of plates extending longitudinally of the bowl and curved so as to extend spirally from near the center of the bowl outwardly, each of said plates being shaped so that a horizontal plane through the plates delineates curves cutting every radius passing through the curve at a constant angle, and a spud secured to each plate and extending through an opening in the next adjacent outer plate and bearing against the inner periphery of the bowl.

7. A skimming device for a centrifugal separator bowl comprising a series of plates extending longitudinally of the bowl and curved so as to extend spirally from the center of the bowl outwardly, each of said plates being shaped so that a horizontal plane through the plates delineates curves cutting every radius passing through the curve at a constant angle, and a spud secured to each plate and extending through an opening in the next adjacent outer plate and bearing against the inner periphery of the bowl, said spuds being also extended inwardly so as to rest against the next adjacent inner plate at a point nearer the center of the bowl than the spud carried by said next adjacent inner plate.

8. A skimming device for a centrifugal separator bowl comprising a series of plates extending longitudinally of the bowl and curved so as to extend spirally from near the center of the bowl outwardly, each of said plates being shaped so that a horizontal plane through the plates delineates curves cutting every radius passing through the curve at a constant angle, and a series of similarly shaped auxiliary plates located between the outer ends of the first-named plates and extending a shorter distance toward the center of the bowl.

In testimony whereof, I affix my signature.

DAVID T. SHARPLES.